United States Patent Office 3,489,716
Patented Jan. 13, 1970

3,489,716
AROMATIC POLYCARBONATE RESINS STABILIZED WITH CYCLOALIPHATIC EPOXY COMPOUNDS
Thornton R. Calkins, Pittsfield, Mass., assignor to General Electric Company, a corporation of New York
No Drawing. Filed Jan. 10, 1968, Ser. No. 696,725
Int. Cl. C08g 51/58
U.S. Cl. 260—45.8                                3 Claims

ABSTRACT OF THE DISCLOSURE

An aromatic polycarbonate resin which is color stable at elevated temperatures, which resin has uniformly dispersed throughout 0.01–0.50 weight percent of an epoxidized cycloaliphatic compound. The epoxidized cycloaliphatic compound employed herein contains 1–2 cycloaliphatic rings of 6 carbon atoms each and wherein at least one oxygen bridge is attached to adjacent carbon atoms in at least one cycloaliphatic ring. Preferably, the epoxidized cycloaliphatic compound is 3,4-epoxycyclohexylmethyl 3,4-epoxycyclohexane carboxylate.

---

This invention is directed to a heat and color stable aromatic polycarbonate resin wherein the aromatic polycarbonate resin contains uniformly dispersed throughout minor quantities of an epoxidized cycloaliphatic compound.

In the art, many thermoplastic polymers require stability both in heat and color since the polymer per se suffers from these deficiencies. Many materials have been found that are quite suitable for rendering a thermoplastic polymer heat and color stable. Particularly useful are the phosphites which have been known to stabilize many thermoplastic polymers. In the case of aromatic polycarbonate resins, phosphites, as disclosed in U.S. Patent 3,305,520, have been found to be very suitable for stabilizing polycarbonates. In addition to phosphites, other materials in combination with phosphites such as tetra aryl-tin compounds disclosed by Canadian Patent 727,700. In addition, mixtures of various phosphites have also been found to be very excellent stabilizers for polycarbonate resins. It has now been surprisingly discovered that a particular compound used solely is an excellent heat and color stabilizer for aromatic polycarbonate resins.

Therefore, it is an object of this invention to provide a heat and color stable aromatic polycarbonate resin.

Another object of this invention is to provide a heat and color stable aromatic polycarbonate resin containing therein uniformly dispersed throughout a particular epoxidized cycloaliphatic compound.

These and other objects of this invention will become apparent from the following detailed description thereof.

Briefly, according to this invention, the foregoing and other objects are attained by incorporating in an aromatic polycarbonate resin uniformly throughout an epoxidized cycloaliphatic compound in an amount ranging from 0.01–0.50 weight percent based on the total weight of the composition. The aromatic polycarbonate resin is thereby rendered heat and color stable through the use of this particular additive.

The following examples are set forth to illustrate more clearly the principle and practice of this invention to those skilled in the art. Unless otherwise specified, where parts or percents are mentioned, they are parts or percents by weight.

EXAMPLE I

The polycarbonate resin, having an intrinsic viscosity of 0.50 as determined in dioxane at 30° C., is prepared by reacting essentially equimolar amounts of 2,2-bis(4-hydroxyphenyl) propane with phosgene in the presence of an acid acceptor such as sodium hydroxide and a catalyst such as triethylamine with a molecular weight regulator such as phenol. The polycarbonate resin so prepared above is blended with 0.15 weight percent of 3,4 - epoxycyclohexylmethyl 3,4 - epoxycyclohexane carboxylate (referred to as stabilizer) and 0.0008 weight percent of an organic tint which is oil violet dye, in a laboratory blender at room temperature. The mixture is then dried at 250° F. for about 16 hours. The mixture is extruded at 525° F. and chopped into pellets. The pellets are then dried at about 250° F. for about 16 hours. Clear transparent sample test discs, 2″ in diameter by ⅛″ thick and designated as Sample 2 below, are then injection molded separately at a temperature of about 600° F. and at a temperature of about 680° F. respectively. Sample test discs were also prepared from the polycarbonate resin with tint only and are designated as Sample 1 below. The samples are then tested for color as molded and after exposure to elevated temperatures (heat aging) in accordance with ASTM Yellowness Index Test D1925–63T and the results are as follows:

TABLE 1

| Sample | As molded | | Heat aged at 284° F. 1 week | |
|---|---|---|---|---|
| | 600° F. | 680° F. | 600° F. | 680° F. |
| (1) Control, no stabilizer | 3.7 | 4.6 | 8.2 | 12.8 |
| (2) With stabilizer | 2.6 | 2.5 | 5.8 | 7.3 |

By the Yellowness Index Test, the higher the number the greater the color. As can be seen, a polycarbonate containing the particular stabilizer disclosed herein, has much better color stability than does unstabilized polycarbonate.

EXAMPLE II

Example I is repeated except that the test discs contain 0.0077 weight percent of ultramarine blue pigment in place of the oil violet dye and the blend is dried at 170° F. instead of 250° F.

The results are as follows:

TABLE 2

| Sample | As molded | | Heat aged at 284° F. 1 week | |
|---|---|---|---|---|
| | 600° F. | 680° F. | 600° F. | 680.° F. |
| (1) Control, no stabilizer | 2.6 | 2.6 | 10.5 | 13.9 |
| (2) With stabilizer | 1.4 | 1.7 | 4.7 | 7.9 |

The instant invention is directed to a heat and color stable aromatic polycarbonate resin wherein the aromatic polycarbonate resin has uniformly dispersed throughout a particular stabilizer. The particular stabilizer employed herein is an epoxidized cycloaliphatic compound containing 1–2 cycloaliphatic rings of six carbon atoms each with at least one oxygen bridge being attached to adjacent carbon atoms in at least one cycloaliphatic ring. The amount of epoxidized cycloaliphatic compound employed herein can range anywhere from 0.01–0.50 weight percent based on the weight of the total composition. By employing the epoxidized cycloaliphatic compound alone, excellent heat and color stable polycarbonate resins are obtained therewith.

In general, any of the epoxidized cycloaliphatic compounds having the above limitations can be employed in the practice of this invention. In place of the 3,4-epoxycyclohexylmethyl 3,4-epoxycyclohexane carboxylate used in the example, the following compounds produce essentially the same results, which compounds are: 3,4-epoxy-6-methylcyclohexylmethyl 3,4-epoxy-6-methylcyclohexane carboxylate, 2,3-epoxycyclohexylmethyl 3,4-epoxycyclohexane carboxylate, 4-(3,4-epoxy-5-methylcyclohexyl) butyl 3,4-epoxycyclohexane carboxylate, 3,4-epoxycyclohexylethylene oxide, di-3,4-epoxy-6-methylcyclohexylmethyl adipate, cyclohexylmethyl 3,4-epoxycyclohexane carboxylate and 3,4-epoxy-6-methylcyclohexylmethyl 6-methylcyclohexyl carboxylate. In the practice of this invention the epoxidized cycloaliphatic compound can contain anywhere from 6 up to 30 carbon atoms. Preferably, however, in the practice of this invention, the preferred epoxidized cycloaliphatic compound is 3,4-epoxycyclohexylmethyl 3,4-epoxycyclohexane carboxylate.

As stated previously, the above described stabilizer is useful for stabilizing an aromatic polycarbonate resin. In general, any aromatic polycarbonates can be employed herein. Generally, the aromatic polycarbonates are polymers of dihydric phenols. The dihydric phenols that can be employed herein are bisphenols such as 1,1-bis(4-hydroxyphenyl)-methane, 2,2-bis(4-hydroxyphenyl)-propane, 2,2-bis(4-hydroxy-3-methylphenyl)-propane, 4,4-bis(4-hydroxyphenyl)-heptane, etc., dihydric phenol ethers such as bis(4-hydroxyphenyl)-ether, bis(3,5-dichloro-4-hydroxyphenyl)-ether, etc., dihydroxy diphenyls such as p,p' - dihydroxydiphenyl, 3,3' - dichloro - 4,4' - dihydroxydiphenyl, etc., dihydroxyaryl sulfones such as bis(4-hydroxyphenyl) - sulfone, bis(3,5 - dimethyl-4-hydroxyphenyl)-sulfone, bis(3-methyl-5-ethyl-4-hydroxyphenyl)-sulfone, etc., dihydroxy benzenes, resorcinol, hydroquinone, halo- and alkyl-substituted dihydroxy benzenes such as, 1,4-dihydroxy-2-chlorobenzene, 1,4-dihydroxy-2,3-dichlorobenzene, 1,4-dihydroxy-3-methylbenzene, etc., and dihydroxy diphenyl sulfoxides such as bis(4-hydroxyphenyl)-sulfoxide, bis-(3,5-dibromo - 4 - hydroxyphenyl)-sulfoxide, etc. A variety of additional dihydric phenols are also available to provide carbonate polymers and are disclosed in U.S. Patents 2,999,835, 3,028,365 and 3,153,008. It is of course possible to employ two or more different dihydric phenols or a copolymer of a dihydric phenol with glycol, a hydroxy or an acid terminated polyester, or a dibasic acid in the event a carbonate copolymer or interpolymer rather than a homopolymer is desired for use in the preparation of the aromatic carbonate polymers of this invention.

Generally, the polycarbonates employed herein are prepared by reacting a dihydric phenol with a carbonate precursor in the presence of a molecular weight regulator and an acid acceptor. The carbonate precursors that can be used herein are either a carbonyl halide, a carbonate ester or a haloformate. The carbonyl halides which can be employed herein are carbonyl bromide, carbonyl chloride, carbonyl fluoride, etc., or mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc., di-(alkylphenyl) carbonates such as di-(tolyl) carbonate, etc., di-(naphthyl) carbonate, di-(chloronaphthyl) carbonate, phenyl tolyl carbonate, chlorophenyl chloronaphthyl carbonate, etc. or mixtures thereof. The haloformates suitable for use herein include bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art carbonyl chloride, also known as phosgene is preferred.

As stated previously, the reaction may be carried out in the presence of an acid acceptor, which acid acceptor may be either an organic or an inorganic compound. A suitable organic acid acceptor is a tertiary amine and includes such materials as pyridine, triethylamine, dimethylaniline, tributylamine, etc. The inorganic acid acceptor may be one which can either be an hydroxide, a carbonate, a bicarbonate or a phosphate of an alkali or alkaline earth metal.

The molecular weight regulators which are also employed in carying out the process for preparing the aromatic polycarbonate resins can be such molecular weight regulators as phenol, cyclohexanol, methanol, para-tertiarybutylphenol, para-bromophenol, etc. Preferably phenol is employed as the molecular weight regulator.

It will thus be seen that the objects set forth above among those made apparent from the preceding description are efficiently attained and certain changes may be made in carrying out the above process and in the composition set forth without departing from the scope of this invention, it is intended that all matters contained in the above description shall be interpreted as illustrative and no tin a limiting sense.

What is claimed is:

1. An aromatic polycarbonate resin color stable at elevated temperatures, which resin consists of a polycarbonate resin of a dihydric phenol having uniformly dispersed throughout 0.01–0.50 weight percent of an epoxidized cycloaliphatic compound containing (a) 1-2 cycloaliphatic rings of six carbon atoms each, with at least one oxygen bridge being attached to adjacent carbon atoms in at least one cycloaliphatic ring, (b) 6 to 30 carbon atoms and (c) only carbon, hydrogen and oxygen.

2. The composition of claim 1 wherein the aromatic polycarbonate resin is a polycarbonate resin of 2,2-bis(4-hydroxyphenyl) propane and phosgene.

3. The composition of claim 1 wherein the epoxidized cycloaliphatic compound is 3,4-epoxycyclohexylmethyl 3,4-epoxycyclohexane carboxylate.

References Cited

UNITED STATES PATENTS

| | | | |
|---|---|---|---|
| 3,113,036 | 12/1963 | Schwarzer | 117—75 |
| 3,121,068 | 2/1964 | Baum | 260—43 |
| 3,148,167 | 9/1964 | Keplinger | 260—40 |
| 3,186,961 | 6/1965 | Sears | 260—30.4 |
| 3,189,570 | 6/1965 | Pavlin et al. | 260—23 |
| 3,210,318 | 10/1965 | Dolce et al. | 260—45.8 |

DONALD E. CZAJA, Primary Examiner

R. A. WHITE, Assistant Examiner

U.S. Cl. X.R.

260—37, 45.7, 45.75